Patented Jan. 16, 1923.

1,442,239

UNITED STATES PATENT OFFICE.

JAMES L. STOLTZ, OF BRONXVILLE, NEW YORK.

COMPOSITION OF MATTER.

No Drawing. Application filed May 27, 1920. Serial No. 384,595.

*To all whom it may concern:*

Be it known that I, JAMES L. STOLTZ, a citizen of the United States, residing at Bronxville, in the county of Westchester and State of New York, have invented a certain new and useful Improvement in Composition of Matter, of which the following is a full, clear, and exact description.

This invention relates to a composition of matter of the nature frequently called a fertilizer, although it is characteristic of my improved composition that, in addition to adding fertility to the soil with which it is used, it improves its texture, corrects undue acidity or alkalinity, revives and enriches run-down soil, and corrects soil conditions not reached by any other fertilizer.

My improved composition of matter consists preferably of a mixture of finely ground marl or limestone, phosphate rock and organic humus mixed together in about equal parts by weight, and impregnated with nitrifying bacteria, preferably to an amount of about twenty pounds of culture per ton.

The ingredients of this composition have a combined interaction upon each other as follows: The presence of the marl or limestone exerts a markedly beneficial effect upon the bacteria as has been noted by different agricultural experiment stations and agricultural schools; the action of the bacteria serves to release the phosphoric content of the phosphate rock in less than one-quarter of the time which would be required in their absence; the evolved phosphoric acid slowly liberates the carbon monoxide from the limestone or marl and renders the lime available for plant use; and the bacteria thrive upon the limestone or marl whereas a more caustic medium would destroy them. If used upon a soil which is unduly acid or sour, the effect of the limestone or marl is rapidly to sweeten the same without at the same time destroying the beneficial organic matter as caustic lime is likely to do; while if used on an unduly alkaline soil the effect of the phosphate rock is to correct the alkalinity as well as to increase the fertility.

It will be understood that other ingredients can be added without departing from my invention, and I do not limit myself except as set forth in the claims hereto annexed.

Having thus described my invention, what I claim is:

1. A composition of matter for the improvement of soil containing about equal parts of a finely divided mineral calcium carbonate and ground phosphate rock, and also containing organic humus and nitrifying bacteria.

2. A composition of matter for the improvement of soil containing a finely divided natural calcium carbonate, nitrifying bacteria, and about equal parts of ground phosphate rock and organic humus.

3. A composition of matter for the improvement of soil containing a finely divided mineral calcium carbonate, ground phosphate rock and organic humus mixed together and impregnated with nitrifying bacteria to an amount of about twenty pounds of culture per ton.

In testimony whereof, I hereunto affix my signature.

JAMES L. STOLTZ.